US012645181B2

(12) United States Patent
Harada et al.

(10) Patent No.: US 12,645,181 B2
(45) Date of Patent: Jun. 2, 2026

(54) CARTRIDGE WITH A GRIPPING PORTION

(71) Applicant: CANON KABUSHIKI KAISHA, Tokyo (JP)

(72) Inventors: Yuko Harada, Kanagawa (JP); Shigemi Kamoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/039,281

(22) Filed: Jan. 28, 2025

(65) Prior Publication Data

US 2025/0244713 A1 Jul. 31, 2025

(30) Foreign Application Priority Data

Jan. 31, 2024 (JP) ................................ 2024-013028

(51) Int. Cl.
*G03G 21/18* (2006.01)
*G03G 15/01* (2006.01)
(Continued)

(52) U.S. Cl.
CPC ..... *G03G 21/1846* (2013.01); *G03G 15/0105* (2013.01); *G03G 15/0889* (2013.01); *G03G 15/0896* (2013.01); *G03G 21/1647* (2013.01); *G03G 21/18* (2013.01); *G03G 21/1803* (2013.01); *G03G 21/1814* (2013.01); *G03G 21/1839* (2013.01); *G03G 21/1842* (2013.01); *G03G 21/1853* (2013.01); *G03G 2221/163* (2013.01); *G03G 2221/1846* (2013.01)

(58) Field of Classification Search
CPC ........... G03G 15/0105; G03G 15/0896; G03G 15/0889; G03G 21/18; G03G 21/1803; G03G 21/1814; G03G 21/1839; G03G 21/1842; G03G 21/1846; G03G 21/1853; G03G 21/1647; G03G 2221/163; G03G 2221/1846
See application file for complete search history.

(56) References Cited

U.S. PATENT DOCUMENTS 5,175,587 A * 12/1992 Kato .................. G03G 15/0894 222/DIG. 1
2005/0135838 A1* 6/2005 Miller ................ G03G 15/0855 399/262
2013/0051834 A1* 2/2013 Kamimura ......... G03G 21/1867 399/116

FOREIGN PATENT DOCUMENTS

JP 2018169436 A 11/2018

* cited by examiner

*Primary Examiner* — Joseph S Wong
(74) *Attorney, Agent, or Firm* — Canon U.S.A., Inc. IP Division

(57) ABSTRACT

A cartridge attachable to/detachable from an apparatus main body of an image forming apparatus in a mounting direction, includes a storage portion storing toner, a stirring member rotating around a rotation axis and stirring the toner in the storage portion, and a gripping portion provided upstream of the storage portion in the mounting direction, wherein the gripping portion includes, when the cartridge is in a mounted orientation of being mounted in the apparatus main body, a concave portion whose an upper part is opened, the concave portion including a bottom surface and first and second walls extending upward from an upstream and a downstream of the bottom surface in the mounting direction, the concave part including an opening extended from the bottom surface to the first wall at a center in the longitudinal direction, and wherein the gripping portion includes a third wall facing the second wall through the opening.

9 Claims, 8 Drawing Sheets

(51) Int. Cl.

| | |
|---|---|
| ***G03G 15/08*** | (2006.01) |
| ***G03G 21/16*** | (2006.01) |

CARTRIDGE WITH A GRIPPING PORTION

BACKGROUND

Field

The present disclosure relates to a cartridge used in an electrophotographic image forming apparatus employing an electrophotographic method.

Description of the Related Art

In electrophotographic image forming apparatuses, there has been a widely employed configuration of a cartridge system in which a cartridge including process members, such as a photosensitive drum and a developing roller, is attachable to/detachable from the apparatus main body of an image forming apparatus. Most of the image forming apparatuses with the cartridge system include an opening for attaching/detaching the cartridge to/from the apparatus main body, and a door for opening/closing the opening. For example, when a cartridge is replaced or a paper jam occurs inside an apparatus main body, a user opens the door, and puts a hand into the apparatus main body to attach/detach the cartridge to/from the apparatus main body. For a user to easily grip the cartridge, the cartridge generally includes a gripping portion (Japanese Patent Application Laid-Open No. 2018-169436).

SUMMARY

According to some embodiments, a cartridge attachable to/detachable from an apparatus main body of an image forming apparatus in a mounting direction, the cartridge includes a storage portion configured to store toner, a stirring member configured to be rotated around a rotation axis and to stir the toner in the storage portion, the rotation axis extending in a direction intersecting the mounting direction, and a gripping portion provided upstream of the storage portion in the mounting direction, wherein the gripping portion includes, when the cartridge is in a mounted orientation of being mounted in the apparatus main body, a concave part whose longitudinal direction is a direction of the rotation axis, an upper part of the concave part being opened, the concave part including a bottom surface, and a first wall and a second wall extending upward respectively from an upstream and a downstream of the bottom surface in the mounting direction, the concave part including an opening extended from the bottom surface to the first wall at a center in the longitudinal direction, and wherein the gripping portion includes a third wall facing the second wall through the opening at a position above the bottom surface and farther from the storage portion than the first wall in a horizontal direction when the cartridge is in the mounted orientation.

Further features of the present disclosure will become apparent from the following description of exemplary embodiments with reference to the attached drawings.

BRIEF DESCRIPTION OF THE DRAWINGS

FIGS. 1A and 1B are enlarged perspective views of a gripping portion.

DESCRIPTION OF THE EMBODIMENTS

Figure 2:
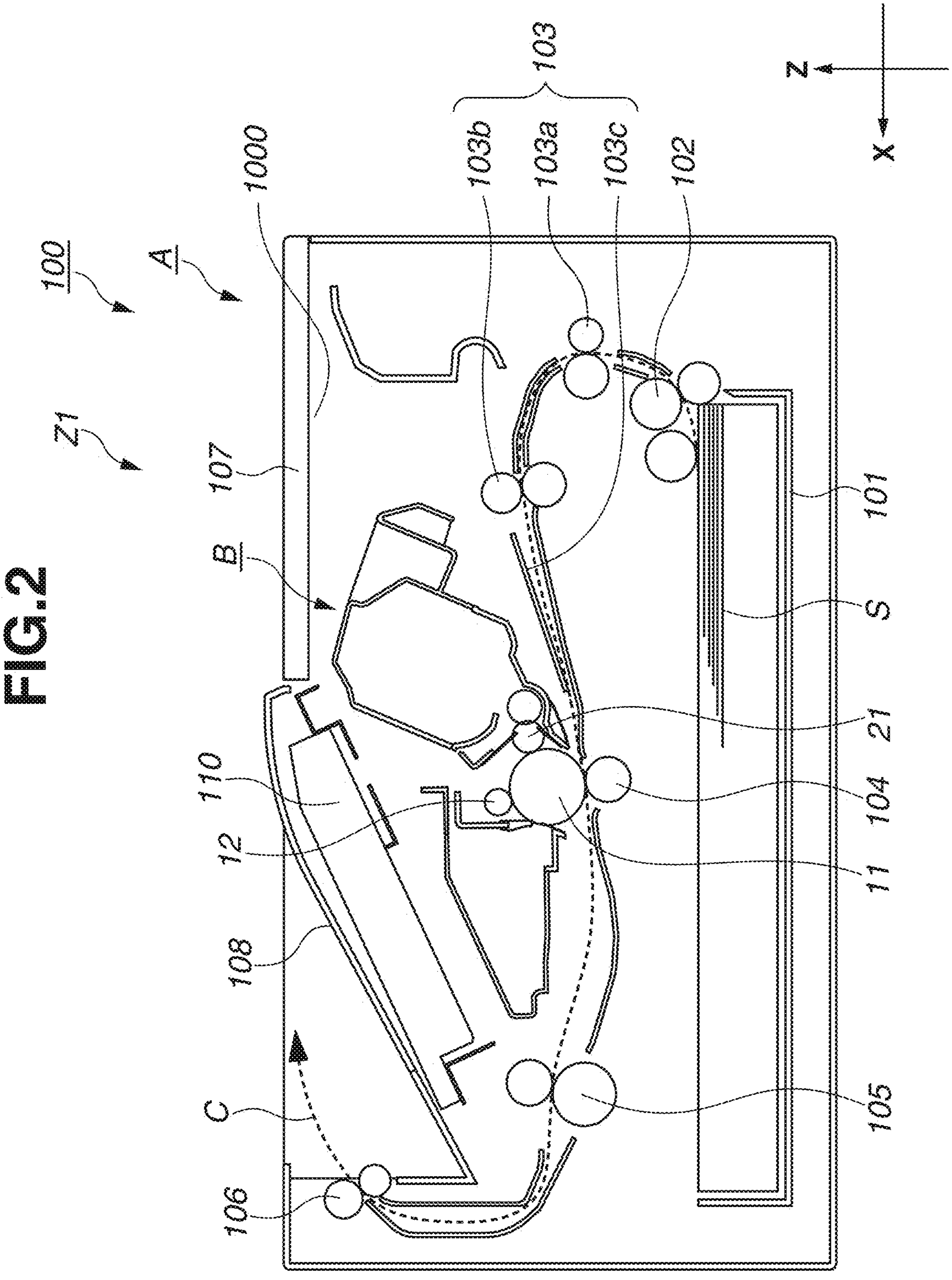
FIG. 2 is a cross-sectional view of an image forming apparatus according to the first exemplary embodiment.

A first exemplary embodiment of the present disclosure will now be described. In the following, the exemplary embodiment will be described with reference to the drawings. FIG. 2 is a cross-sectional view illustrating the schematic configuration of a laser beam printer 100 as an example of an electrophotographic image forming apparatus.

<General Configuration of Laser Beam Printer>

As illustrated in FIG. 2, the laser beam printer 100 includes a cartridge B and an apparatus main body A to/from which the cartridge B is attachable/detachable. In the following description, a direction paralleled to a gravity direction will be defined as a Z direction, a horizontal direction perpendicular to the gravity direction in FIG. 2 as an X direction, and a direction perpendicular to the X direction and the Z direction as a Y direction.

The apparatus main body A includes a sheet storage portion 101, a sheet feeding unit 102, a sheet conveyance unit 103, a transfer roller 104, a fixing unit 105, a sheet discharge unit 106, and a laser scanner 110. The cartridge B includes a photosensitive drum 11, a charging roller 12, and a developing roller 21. A rotation axis direction (a longitudinal direction) of the photosensitive drum 11 is the Y direction in FIG. 2.

The sheet conveyance unit 103 includes a first pair of conveyance rollers 103*a*, a second pair of conveyance rollers 103*b*, and a pretransfer guide 103*c*. The first pair of conveyance rollers 103*a* conveys a sheet fed by the sheet feeding unit 102, to the second pair of conveyance rollers 103*b*. The second pair of conveyance rollers 103*b* conveys the sheet conveyed by the first pair of conveyance rollers 103*a*, to a transfer nip formed between the transfer roller 104 and the photosensitive drum 11. The pretransfer guide 103*c* guides the sheet to the transfer nip.

The apparatus main body A further includes an openable/closable door 107 (an openable/closable member) for opening/closing an opening 1000 through which the cartridge B passes when the cartridge B is attached to/detached from the apparatus main body A. The details thereof will be described below.

<Image Forming Process>

An image forming process of the image forming apparatus according to the present exemplary embodiment will be described with reference to FIG. 2. As illustrated in FIG. 2, a sheet S stored in the sheet storage portion 101 is fed by the sheet feeding unit 102 in response to a print start signal, and conveyed by the sheet conveyance unit 103 along a dashed line C.

When the sheet S is conveyed to a predetermined position, an image forming start signal is generated, and in response to the signal, the image forming process is started. When the image forming process is started, the photosensitive drum 11 rotationally driven by a not-illustrated driving source (a motor) is uniformly charged to a predetermined potential by the charging roller 12. A surface of the charged photosensitive drum 11 is exposed by the laser scanner 110 based on the image information. Charge on the exposed portion is removed, and an electrostatic latent image is formed. The toner in the cartridge B is carried by the developing roller 21 and supplied to the photosensitive drum 11 based on the electrostatic latent image, and then the electrostatic latent image on the photosensitive drum 11 is developed. As a result, the electrostatic latent image is made visible as a toner image on the photosensitive drum 11.

When the sheet S conveyed by the sheet conveyance unit 103 passes through the transfer nip formed between the transfer roller 104 and the photosensitive drum 11, a voltage is applied to the transfer roller 104 from the apparatus main body A, and the toner image on the photosensitive drum 11 is transferred as an unfixed image to the sheet S. Thereafter, the sheet S with the toner image transferred thereon is conveyed to the fixing unit 105, and the unfixed image is fixed to a surface of the sheet S with heat and pressure. Sheets S with toner images fixed thereon are discharged by the sheet discharge unit 106 to be stacked on a discharge tray 108.

<Configuration of Cartridge>

Figure 3:
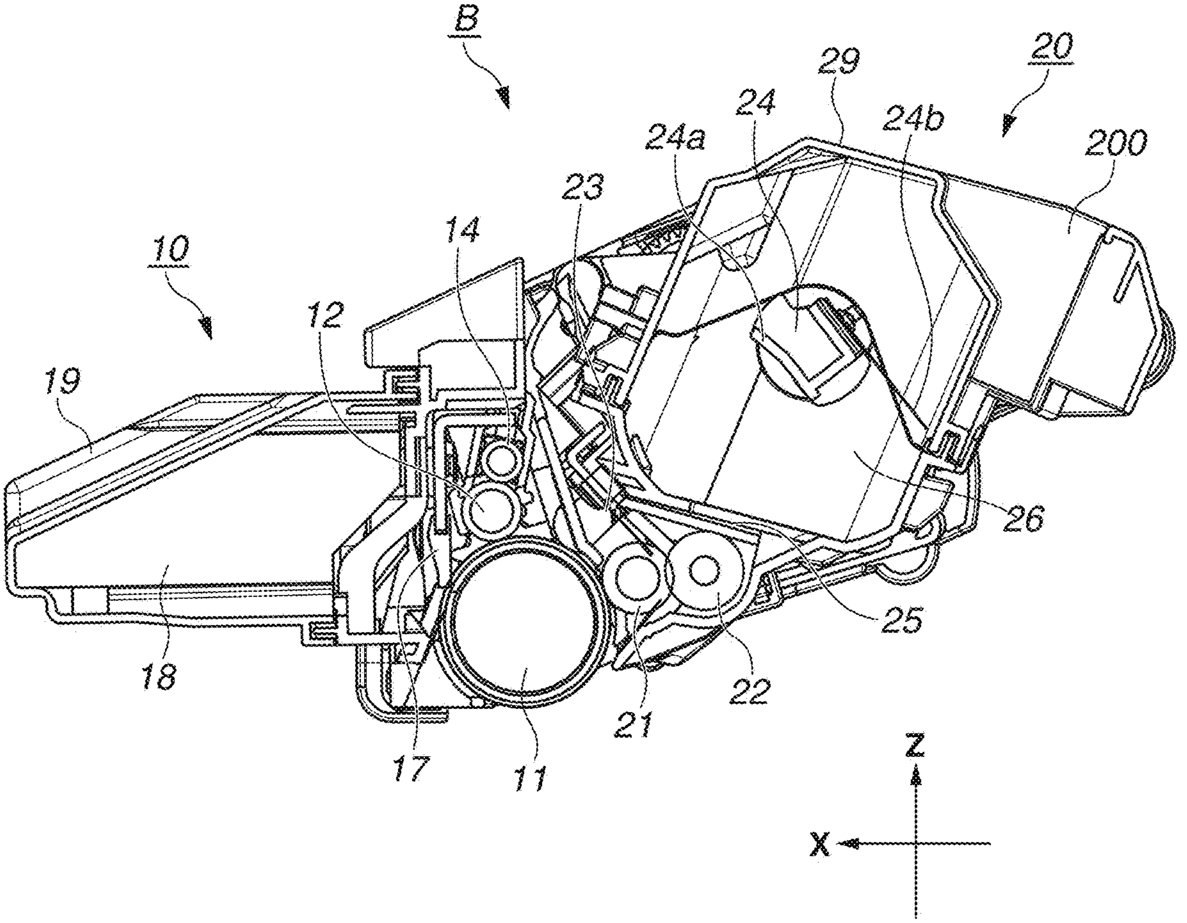
FIG. 3 is a cross-sectional view of the cartridge according to the first exemplary embodiment.
Figure 4A:
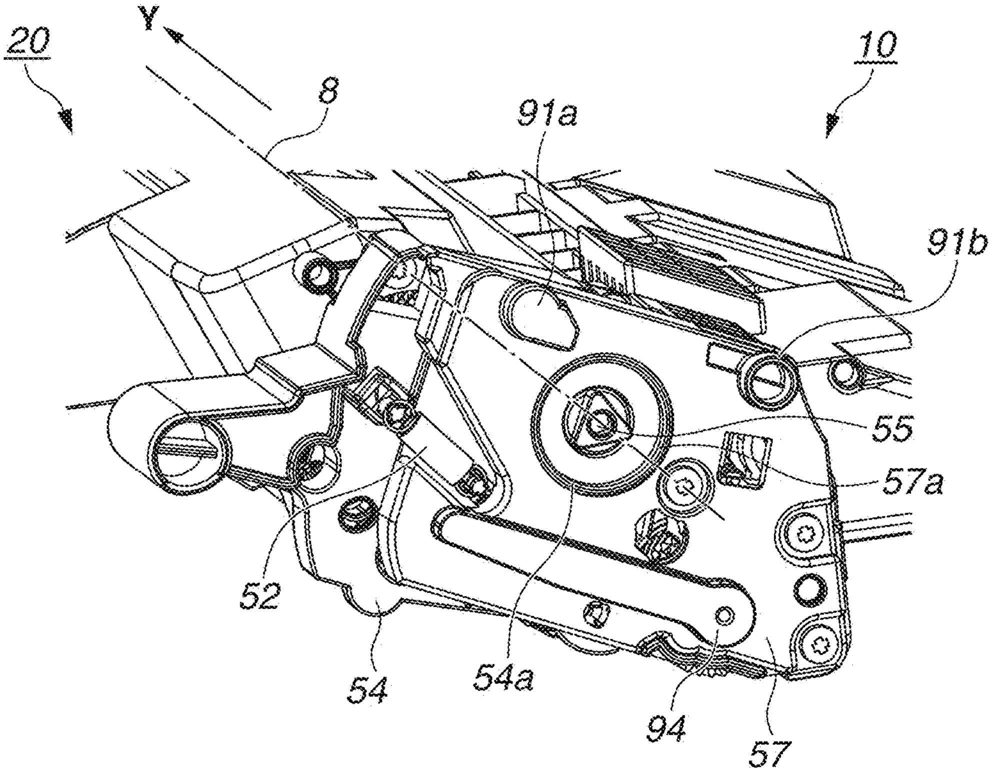
FIGS. 4A and 4B are perspective views illustrating side surfaces of the cartridge according to the first exemplary embodiment.
Figure 4B:
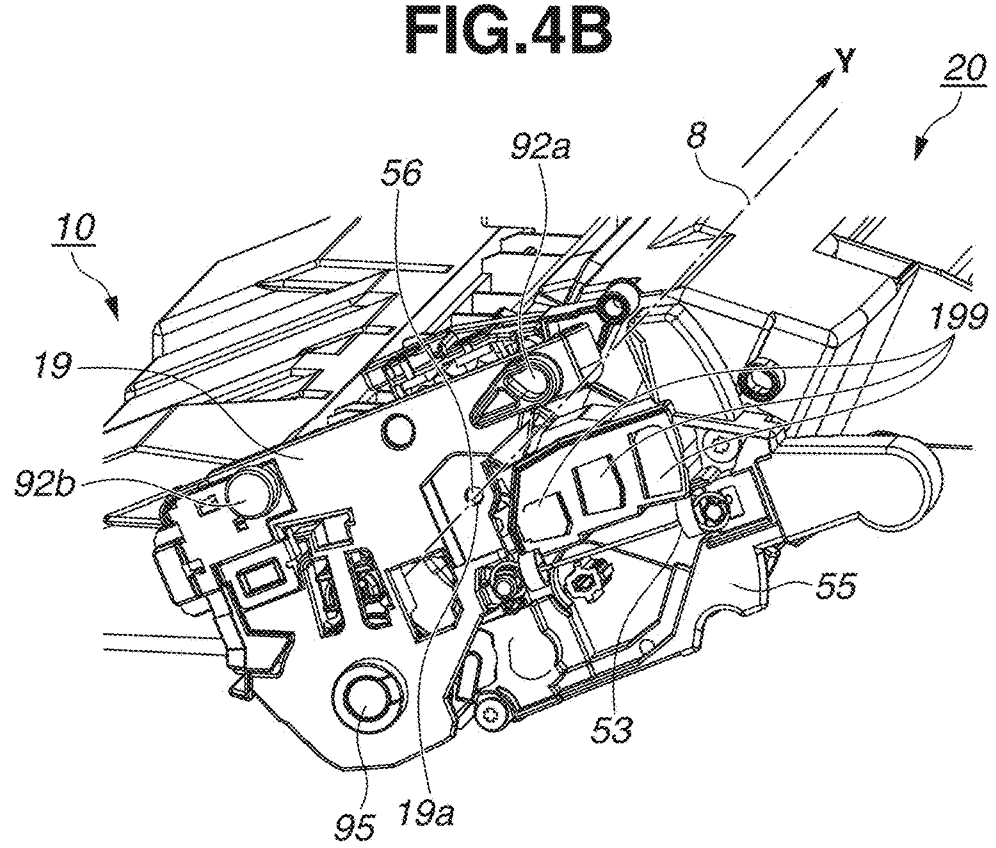

A configuration of the cartridge B according to the present exemplary embodiment will now be described with reference to FIGS. 3, 4A and 4B. FIG. 3 is a cross-sectional view of the cartridge B mounted in the apparatus main body A. FIG. 4A is a perspective view illustrating a side surface of the cartridge on a drive side on which the cartridge B receives the driving force from the apparatus main body A. FIG. 4B is a perspective view illustrating a side surface of the cartridge on a non-drive side opposite to the drive side.

As illustrated in FIG. 3, the cartridge B includes a drum unit 10 including the photosensitive drum 11 (an image carrier), and a developing unit 20 including the developing roller 21 that develops electrostatic latent images formed on the photosensitive drum 11 with toner supplied to the photosensitive drum 11.

The drum unit 10 includes the photosensitive drum 11, the charging roller 12, a charging roller cleaner 14, a cleaning blade 17, and a drum frame 19. The charging roller 12 is disposed to be in contact with the outer peripheral surface of the photosensitive drum 11, and charges the photosensitive drum 11 with voltage application from the apparatus main body A. The charging roller cleaner 14 cleans the surface of the charging roller 12. The cleaning blade 17 has flexibility, is disposed to be in contact with the outer peripheral surface of the photosensitive drum 11, and cleans the surface of the photosensitive drum 11. The toner (used toner) removed from the photosensitive drum 11 by the cleaning blade 17 is stored in a used-toner storage portion 18. The drum frame 19 forms the used-toner storage portion 18, and rotatably supports the photosensitive drum 11.

The developing unit 20 includes the developing roller 21, a supply roller 22, a developing blade 23, a stirring member 24, and a developing unit frame 29 including a developing chamber 25 and a storage chamber 26 (a storage portion). The stirring member 24 is provided in the storage chamber 26, includes a rotary shaft 24*a* and a sheet 24*b* fixed to the rotary shaft 24*a*, and stirs the toner stored in the storage chamber 26. The developing roller 21 and the supply roller 22 are disposed in the developing chamber 25. The toner stored in the storage chamber 26 is sent from the storage chamber 26 to the developing chamber 25 by the stirring member 24. The supply roller 22 supplies the toner in the developing chamber 25 to the developing roller 21. The developing blade 23 in contact with the peripheral surface of the developing roller 21 to regulate the layer thickness of the toner on the peripheral surface of the developing roller 21 rubs against the toner to apply charge to the toner. The developing unit frame 29 includes a gripping portion 200 (a handle) for a user to grip the cartridge B. The gripping portion 200 will be described below.

A configuration in which the developing unit 20 is supported by the drum unit 10 will now be described in detail. As illustrated in FIGS. 4A and 4B, the developing unit 20 includes a first bearing member 54 and a second bearing member 55 at the ends of the developing roller 21 (not illustrated in FIGS. 4A and 4B) in a rotational axis direction (a Y direction), and is supported by the drum unit 10 rotatable around a swing axis 8 extending in the Y direction. The cartridge B includes a first spring 52 and a second spring 53 that are tension coil springs. One ends of the first spring 52 and the second spring 53 engage with the developing unit 20, and the other ends of the first spring 52 and the second spring 53 engage with the drum unit 10.

As illustrated in FIG. 4A, a cylindrical portion 54*a* on the first bearing member 54 of the developing unit 20 is supported by a cylindrical hole portion 57*a* in a side cover 57 of the drum unit 10. The swing axis 8 is the center line common to the cylindrical hole portion 57*a* of the side cover 57 and the cylindrical portion 54*a* of the first bearing member 54. A developing coupling 55 as a driving force reception member for rotating the developing roller 21 is provided to be rotated around the swing axis 8.

On the non-drive side, as illustrated in FIG. 4B, a pin 56 is inserted into both a hole portion 19*a* of the drum frame 19 and a cylindrical hole portion (not illustrated) of the second bearing member 55. The swing axis 8 is the center line common to the pin 56 and the cylindrical hole portion of the second bearing member 55. The developing unit 20 is supported by the drum unit 10 rotatable around the swing axis 8 relative to the drum unit 10. The developing unit 20 is urged toward the drum unit 10 by the first spring 52 and the second spring 53, which makes the developing roller 21 in contact with the photosensitive drum 11.

<Method of Attaching/Detaching Cartridge>

Figure 5A:
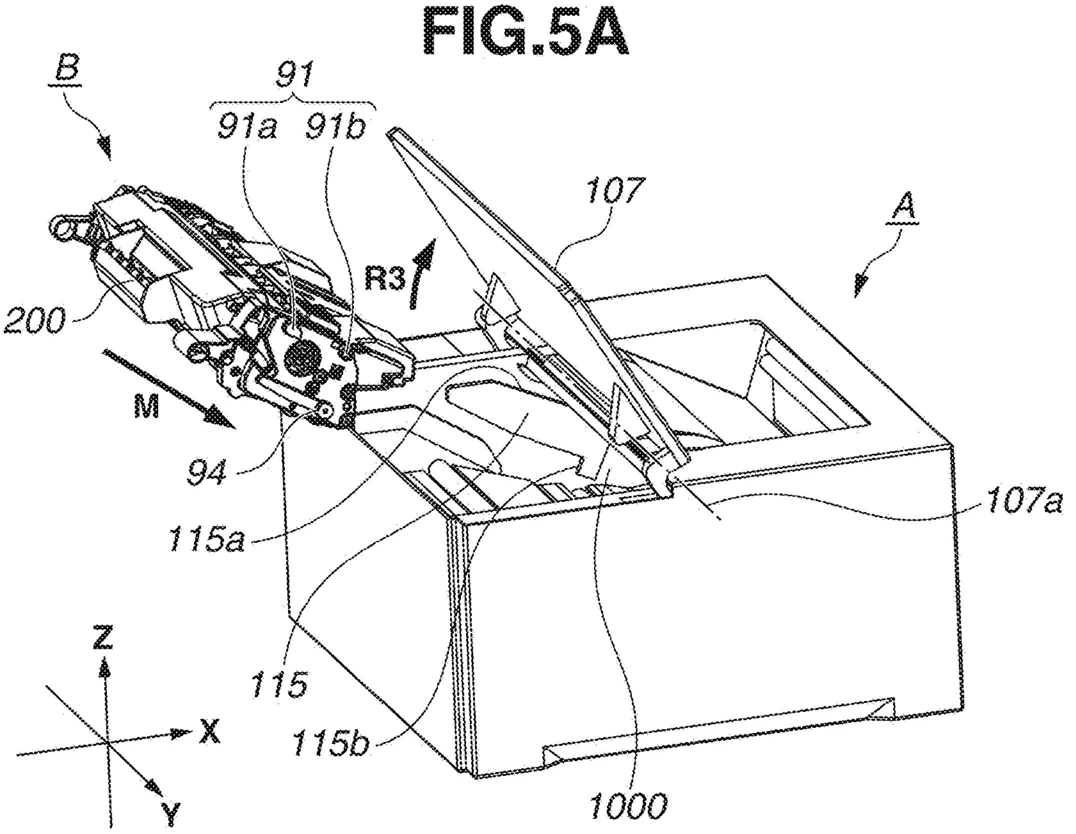
FIGS. 5A and 5B are perspective views of an apparatus main body and the cartridge according to the first exemplary embodiment, immediately before the cartridge is mounted in the apparatus main body.
Figure 5B:
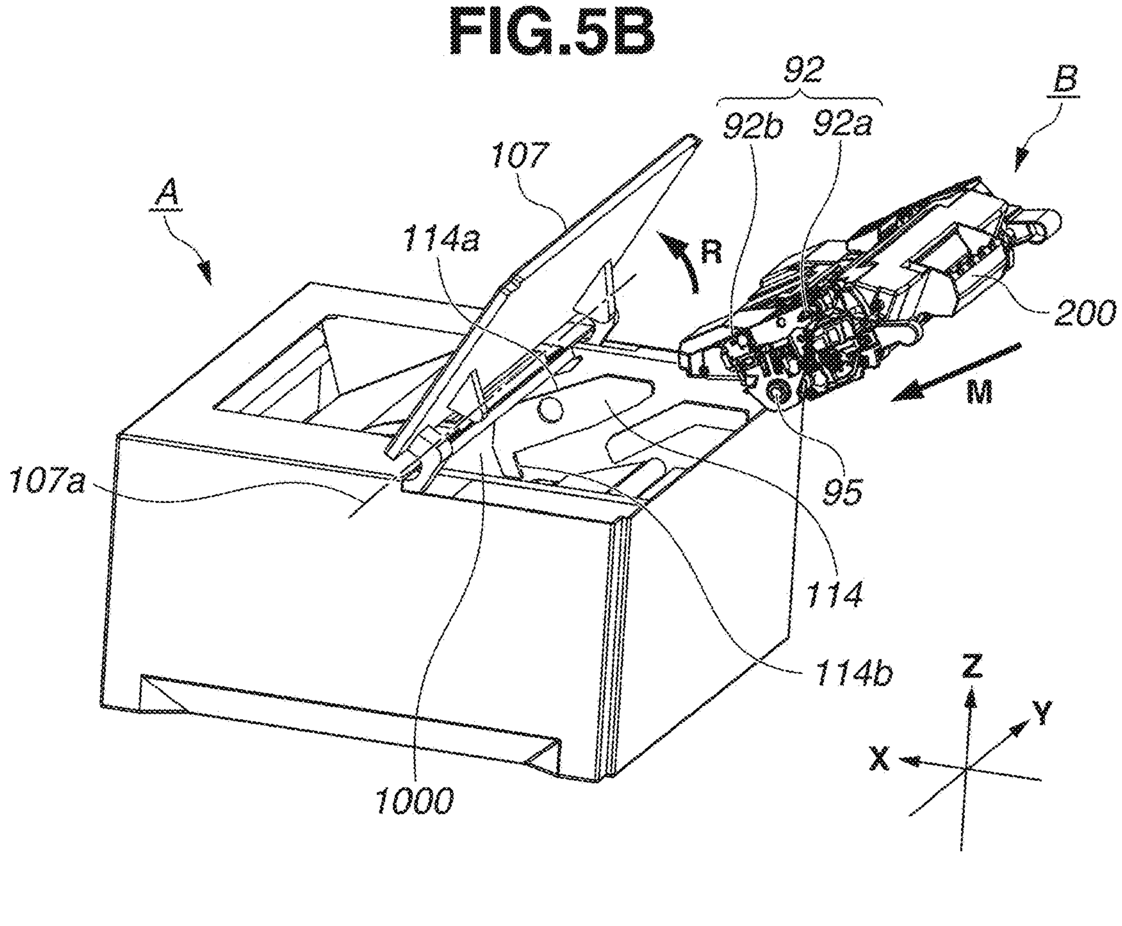

A method of attaching/detaching the cartridge B to/from the apparatus main body A will now be described with reference to FIGS. 5A and 5B. FIGS. 5A and 5B are perspective views each illustrating a state where the openable/closable door 107 is opened before the cartridge B is mounted in the apparatus main body A.

As illustrated in FIGS. 5A and 5B, an internal space of the apparatus main body A is a mounting portion of the cartridge B, and the opening 1000 provided on the upper surface of the apparatus main body A is opened/closed by the openable/closable door 107. When the openable/closable door 107 is pivoted in a rotation direction R3 around a rotation axis 107*a* relative to the apparatus main body A, the opening 1000 is exposed. A first guide member 114 and a second guide member 115 are provided inside the apparatus main body A.

The cartridge B includes a first supporting boss 91*a*, a second supporting boss 91*b*, and a positioning boss 94 on an end surface on the drive side in the Y direction, and a third supporting boss 92*a*, a fourth supporting boss 92*b*, and a positioning boss 95 on an end surface on the non-drive side in the Y direction. The first supporting boss 91*a* is provided upstream of the second supporting boss 91*b* in a mounting direction M. The third supporting boss 92*a* is provided upstream of the fourth supporting boss 92*b* in the mounting direction M. As described above, the cartridge B includes the gripping portion 200 for a user to grip the cartridge B.

When the cartridge B is mounted in the apparatus main body A, a user grips the gripping portion 200 of the cartridge B and moves the cartridge B in the mounting direction M to mount the cartridge B on the apparatus main body A. In the mounting step, the first supporting boss 91*a* and the second supporting boss 91*b* of the cartridge B are supported by the upper surface 114*a* of the first guide member 114, and the first positioning boss 94 is inserted under the first guide member 114. Similarly, on the non-drive side of the cartridge B, the third supporting boss 92*a* and the fourth supporting boss 92*b* are supported by the upper surface 115*a* of the second guide member 115, and the second positioning boss 95 is moved under the second guide member 115. In other words, the first supporting boss 91*a*, the second supporting boss 91*b*, and the first positioning boss 94 surround the first guide member 114, and the third supporting boss 92*a*, the fourth supporting boss 92*b*, and the second positioning boss 95 surround the second guide member 115. As described above, the cartridge B is mounted in the apparatus main body A while the orientation of the cartridge B is restricted by the first guide member 114 and the second guide member 115.

The mounting direction M and a detaching direction D according to the present exemplary embodiment are directions in which the cartridge B is moved while the first supporting boss 91*a* and the second supporting boss 91*b* of the cartridge B are supported by the upper surface 114*a* of the first guide member 114, and the third supporting boss 92*a* and the fourth supporting boss 92*b* are supported by the upper surface 115*a* of the second guide member 115.

The mounting of the cartridge B is completed while the first positioning boss 94 and the second positioning boss 95 abut on a positioning surface 114*b* of the first guide member 114 and a positioning surface 115*b* of the second guide member 115, respectively. When the openable/closable door 107 is closed in this state, the laser beam printer 100 is capable of performing image formation. To detach the cartridge B from the apparatus main body A, a procedure reverse to the above-described mounting procedure is performed.

<Gripping Portion>

Figure 1A:
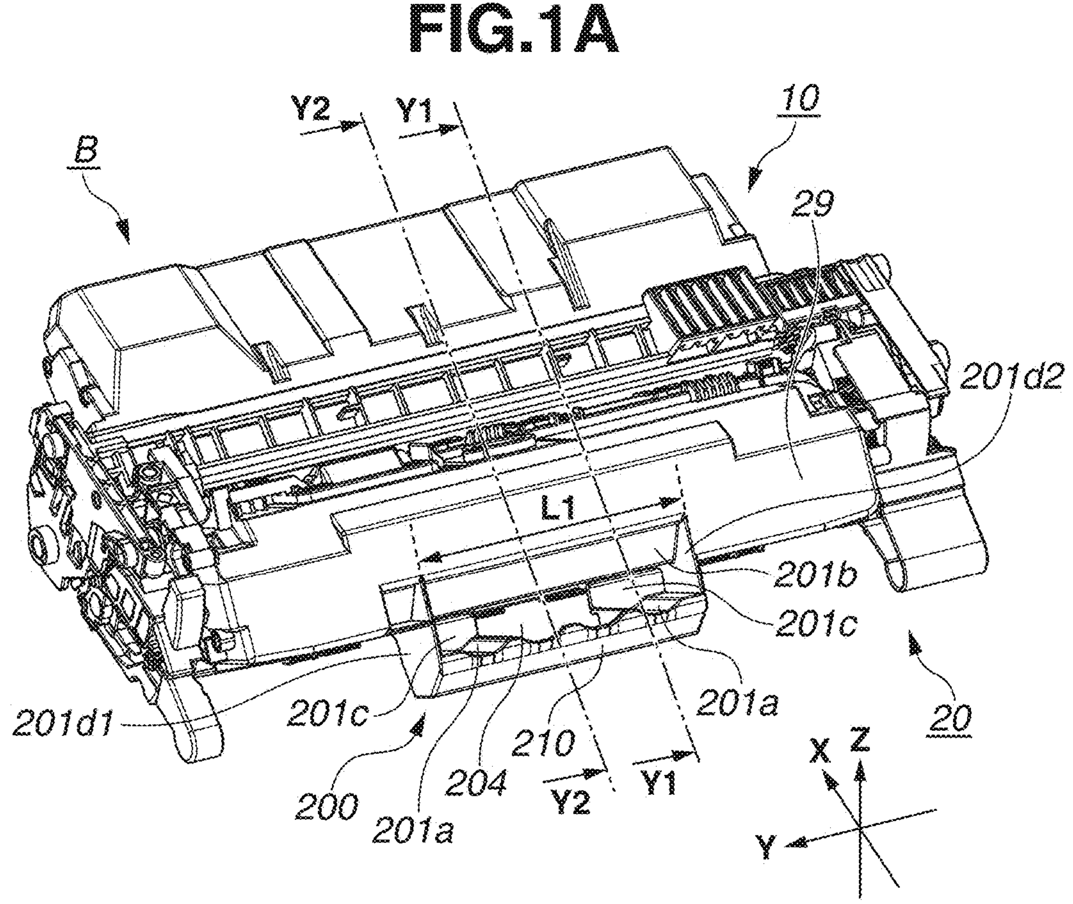
FIGS. 1A to 1C are perspective views of a cartridge according to a first exemplary embodiment.
Figure 1B:
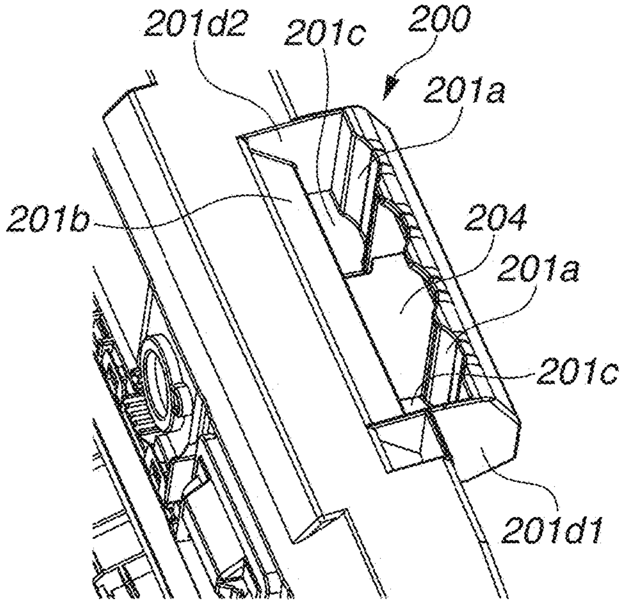
Figure 1C:
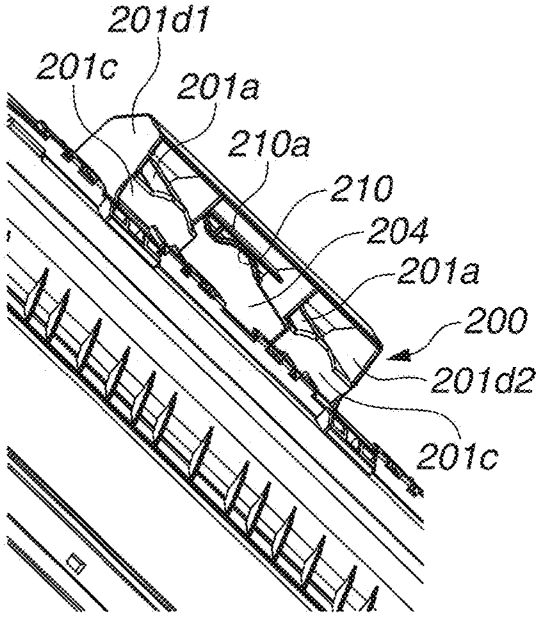
Figure 6A:
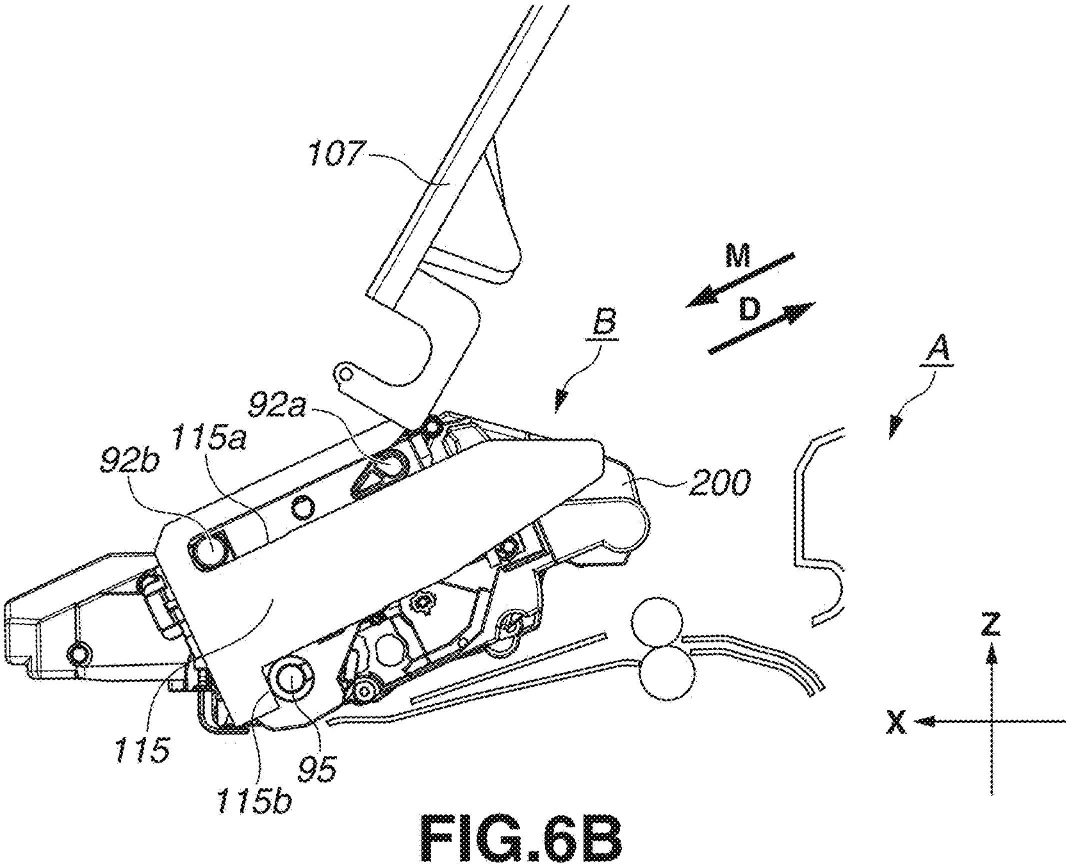
FIGS. 6A and 6B are side views of the apparatus main body and the cartridge according to the first exemplary embodiment, in a state where the cartridge is completely mounted in the apparatus main body and in a state during attachment/detachment.
Figure 6B:
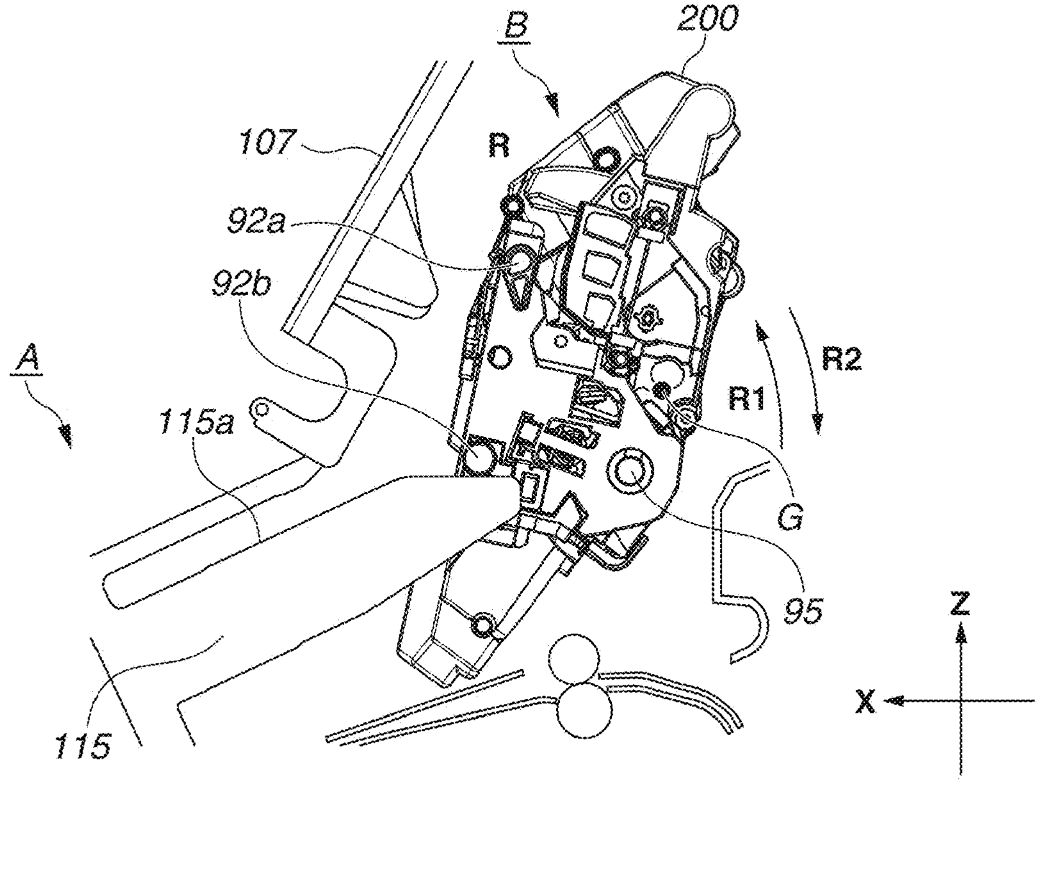
Figure 7A:
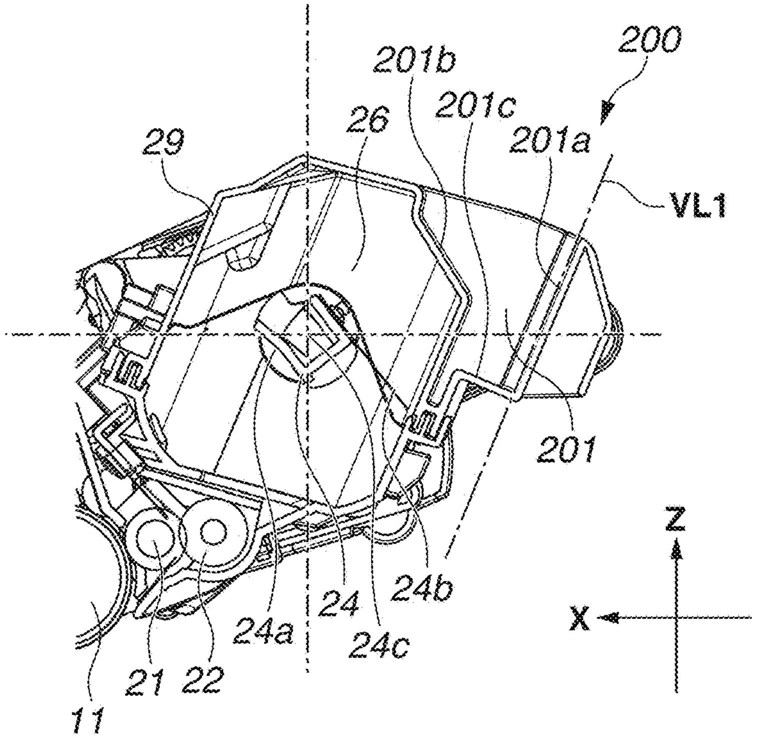
FIGS. 7A and 7B are cross-sectional views of the cartridge according to the first exemplary embodiment, in the state where the cartridge is completely mounted in the apparatus main body.
Figure 7B:
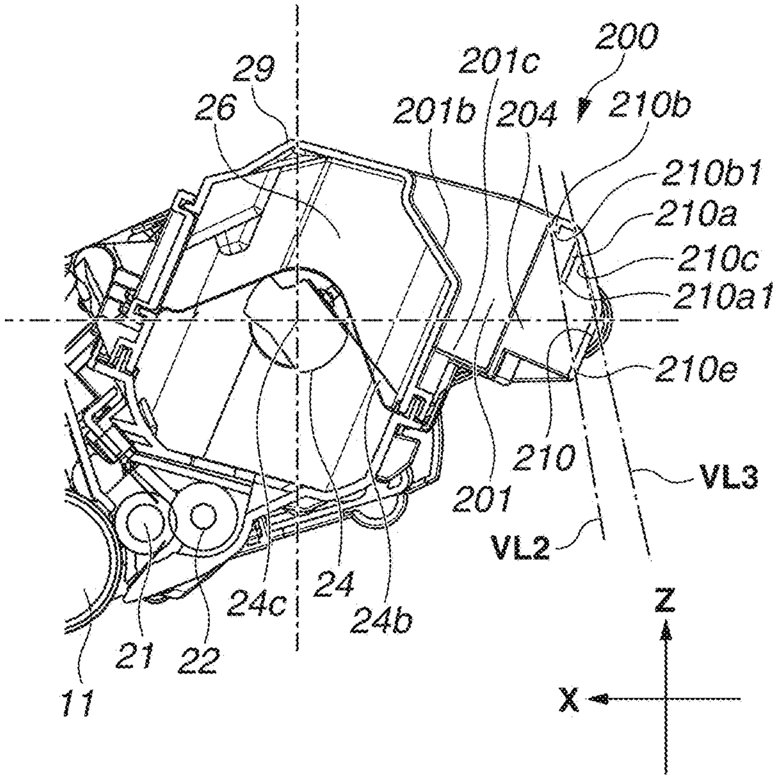
Figure 8B:
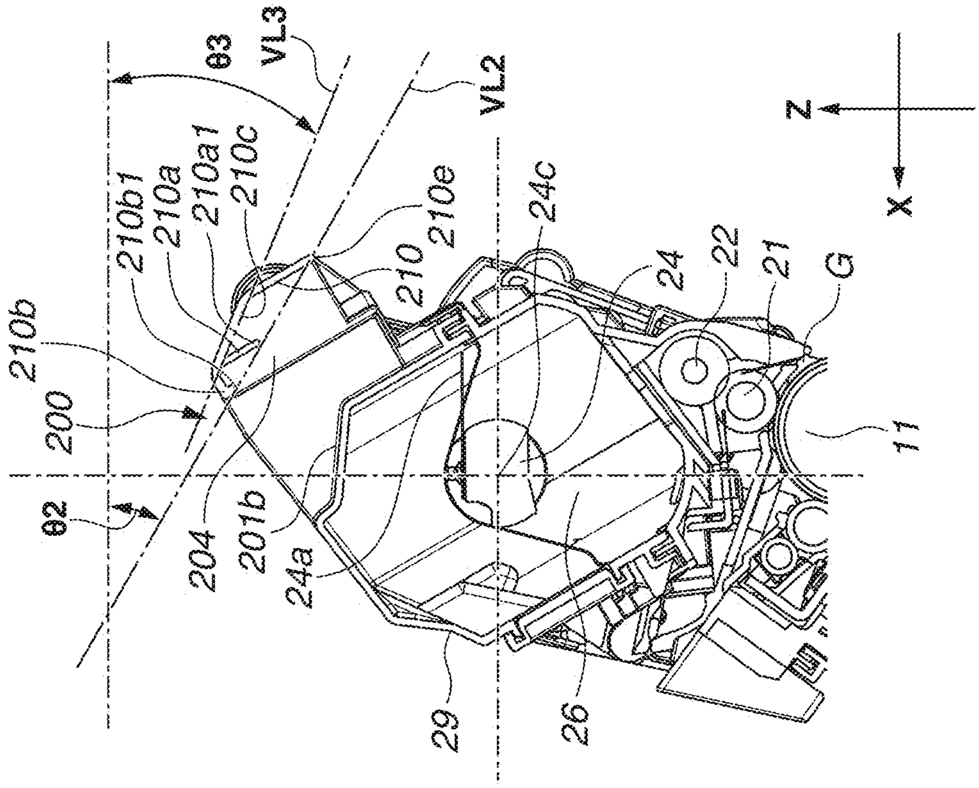
FIGS. 8A and 8B are cross-sectional views of the apparatus main body and the cartridge according to the first exemplary embodiment, in the state during attachment/detachment of the cartridge to/from the apparatus main body.
Figure 8A:
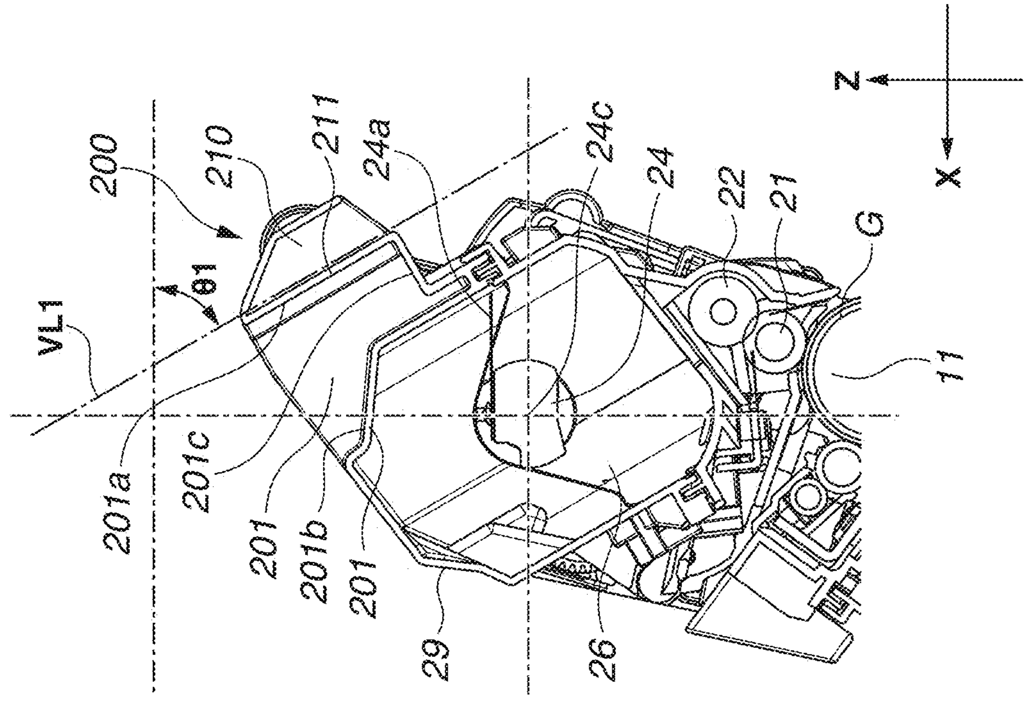

The gripping portion 200 of the cartridge B as a feature of the present exemplary embodiment will be described with reference to FIGS. 1A to 1C, 6A, 6B, 7A, 7B, 8A and 8B. FIGS. 1A to 1C are perspective views of the cartridge B as viewed in the direction of an arrow Z1 in FIG. 2. FIG. 1A is a perspective view of the cartridge B as viewed in the direction of the arrow Z1 in FIG. 2. FIG. 1B is an enlarged perspective view of the gripping portion 200 as viewed from obliquely above. FIG. 1C is an enlarged perspective view of the gripping portion 200 as viewed from below. FIG. 6A is a diagram illustrating a state where the cartridge B is completely mounted in the apparatus main body A. FIG. 6B is a diagram illustrating a state in the middle of attachment/detachment of the cartridge B to/from the apparatus main body A. FIG. 7A illustrates a cross-sectional surface Y1 in FIG. 1A with the cartridge B mounted. FIG. 7B illustrates a cross-sectional surface Y2 with the cartridge B mounted. FIG. 8A illustrates a cross-sectional surface Y1 in FIG. 1A in the state during attachment/detachment. FIG. 8B illustrates a cross-sectional surface Y2 in the state during attachment/detachment.

As illustrated in FIG. 6A, the gripping portion 200 is provided upstream of the cartridge B in the mounting direction M while the cartridge B is mounted in the apparatus main body A (in a state where the mounting is completed). When the cartridge B is detached from the apparatus main body A, a user puts a hand into the apparatus main body A through the opening 1000 of the apparatus main body A, and then moves the cartridge B in the detaching direction D opposite to the mounting direction M. At this time, the cartridge B is moved in the detaching direction D while the third supporting boss 92*a* and the fourth supporting boss 92*b* of the cartridge B are supported by the upper surface 115*a* of the second guide member 115. Although not illustrated in FIG. 6A, the cartridge B is moved in the detaching direction D while the first supporting boss 91*a* and the second supporting boss 91*b* on the drive side are also supported by the upper surface 114*a* of the first guide member 114. Thereafter, on the non-drive side, while the third supporting boss 92*a* passes through the second guide member 115 and the fourth supporting boss 92*b* is supported by the upper surface 115*a* of the second guide member 115 as illustrated in FIG. 6B, the user lifts the gripping portion 200 in order to rotate the cartridge B around the fourth supporting boss 92*b* in a rotation direction R1. The user lifts the cartridge B with the gripping portion 200 lifted, and detaches the cartridge B from the apparatus main body A through the opening 1000 of the apparatus main body A.

Different from the orientation of the cartridge B illustrated in FIG. 6A, the orientation of the cartridge B illustrated in FIG. 6B is one formed by the gripping portion 200 being lifted. In the case of the orientation of the cartridge B illustrated in FIG. 6B, a gravity center G of the cartridge B is downstream of the fourth supporting boss 92*b* supported by the second guide member 115 in the detaching direction D. Thus, the cartridge B is rotated in a rotation direction R2 by its own weight. The gripping portion 200 desirably has a shape easily gripped by fingers of the user while the cartridge B is in the orientation illustrated in FIG. 6A.

The gripping portion 200 according to the present exemplary embodiment has a structure described in the following when the orientation of the cartridge B is the installation orientation in which the cartridge B is completely mounted in the apparatus main body A.

As illustrated in FIGS. 1A to 1C, the gripping portion 200 includes a concave part 201 whose longitudinal direction is a rotation axis direction of the rotary shaft 24*a* of the stirring member 24, the upper part of the concave part 201 being opened. As illustrated in FIGS. 1A to 1C and FIGS. 7A and 7B, the concave part 201 includes a bottom surface 201*c*, a first wall 201*a* and a second wall 201*b* extending upward respectively from the upstream and the downstream of the bottom surface 201*c* in the mounting direction M, and a fourth wall 201*d*1 and a fifth wall 201*d*2 that are both end surfaces in the longitudinal direction. The user puts fingers into the concave part 201 to grip the cartridge B. Thus, a width (a distance L1 from fourth wall 201*d*1 to fifth wall 201*d*2 in FIG. 1A) of the concave part 201 corresponds to about four fingers of a user.

As illustrated in FIG. 7A, a virtual line VL1 that extends along the first wall 201*a* on a cross-section perpendicular to the rotation axis of the rotary shaft 24*a* is inclined so as to be directed downward as approaching the storage chamber 26 in the horizontal direction. In other words, the first wall 201*a* is inclined so as to be directed downward as approaching the storage chamber 26 in the horizontal direction, namely, the first wall 201*a* is inclined so as to be directed downward in the mounting direction M. The first wall 201*a* has a function of guiding insertion of fingers of a user into the concave part 201. Thus, the inclined first wall 201*a* facilitates the user to put, from above, fingers into the concave part 201 of the gripping portion 200 of the cartridge B in the orientation with the mounting completed.

The second wall 201*b* is a wall included in the storage chamber 26 in the present exemplary embodiment. The second wall 201*b* is a wall with which the sheet 24*b* of the stirring member 24 comes into contact when the sheet 24*b* is rotated. However, the second wall 201*b* may be a wall different from the wall included in the storage chamber 26.

As illustrated in FIGS. 1A to 1C and FIG. 7B, the concave part 201 includes an opening 204 extended from the bottom surface 201*c* to the first wall 201*a* at the center in the longitudinal direction. The gripping portion 200 further includes a third wall 210 provided above the bottom surface 201*c* of the concave part 201 and is farther from the storage chamber 26 than the first wall 201*a* in the horizontal direction. The third wall 210 is provided at the opening 204 in the longitudinal direction, and faces the second wall 201*b* through the opening 204. In other words, the third wall 210 is at a position accessible from the concave part 201 through the opening 204. In addition, the third wall 210 is provided at a position overlapping with the rotation axis 24*c* in the horizontal direction when the cartridge B is in the mounted orientation.

The third wall 210 includes an inclined surface 210*c*. A virtual line VL3 extending along the inclined surface 210*c* on the cross-section perpendicular to the rotation axis of the rotary shaft 24*a* is inclined so as to be directed upward as approaching the storage chamber 26 in the horizontal direction, and extends in a direction intersecting the virtual line VL1. In other words, the inclined surface 210*c* is inclined so as to be directed upward as approaching the storage chamber 26 in the horizontal direction. The third wall 210 further includes ribs 210*a* and 210*b* that protrude downward, above a lowest point 210*e* of the third wall 210 in the cross-section perpendicular to the rotation axis of the rotary shaft 24*a*. A virtual line VL2 passing a lower end 210*al* and the lowest point 210*e* of the rib 210*a* is inclined so as to be directed upward as approaching the storage chamber 26 in the horizontal direction, and extends in a direction intersecting the virtual line VL1. The virtual line VL2 also passes a lower end 210*b*1 of the rib 210*b*. In other words, the virtual line VL2 passing the lower end 210*b*1 of the rib 210*b* and the lowest point 210*e* is inclined so as to be directed upward as approaching the storage chamber 26 in the horizontal direction. The third wall 210 can include the inclined surface 210*c* without including the ribs 210*a* and 210*b*. The third wall 210 may not include a surface in an inclination direction similar to the inclined surface 210*c* as long as a virtual line can be drawn in the inclination direction similar to the virtual line VL2 passing the end of the rib. The rib of the third wall 210 may extend in the horizontal direction as long as a virtual line can be drawn in the inclination direction similar to the virtual line VL2 passing the end of the rib.

The effect produced by the gripping portion 200 when the cartridge B is in the orientation of attachment/detachment illustrated in FIG. 6B will be described. FIGS. 8A and 8B respectively illustrate the cross-sectional surface Y1 (the end of gripping portion 200) and the cross-sectional surface Y2 (the center of gripping portion 200) illustrated in FIG. 1A in the state during attachment/detachment of the cartridge B to/from the apparatus main body A.

The third wall 210 is configured such that an inclination angle θ2 of the virtual line VL2 to a horizontal line is less than an inclination angle θ1 of the virtual line VL1 to the horizontal line. Further, the third wall 210 is configured such that an inclination angle θ3 of the virtual line VL3 to a horizontal line is less than the inclination angle θ1 of the virtual line VL1 to the horizontal line. Thus, when the cartridge B is in the orientation illustrated in FIG. 6B, the third wall 210 has an angle close to the horizontal direction compared to the first wall 201*a*. In a case where the user puts fingers into the concave part 201 from above and hooks the fingers on the gripping portion 200, the third wall 210 facilitates the user to lift the gripping portion 200 compared to the first wall 201*a*. The gripping portion 200 can be more easily supported by fingers from below as the wall of the gripping portion 200 of the cartridge B on which the fingers are hooked has the smaller angle to the horizontal line. As a result, when the user lifts the gripping portion 200, use of frictional force between the fingers and the wall is reduced. Thus, the user can lift the gripping portion 200 with a light grip of the gripping portion 200.

The function of the bottom surface 201*c* will now be described. The opening 204 in the concave part 201 is provided at the center in the longitudinal direction, and includes the bottom surface 201*c* at both the ends. In FIG. 2, the pair of second conveyance rollers 103*b* and the pretransfer guide 103*c* of the apparatus main body A are disposed just below the gripping portion 200. Suppose the opening 204 is formed over the region of the concave part 201 in the longitudinal direction, all the fingers inserted into the concave part 201 may extend downward through the opening 204, and be hooked on the pair of second conveyance rollers 103*b* and the pretransfer guide 103*c*, which can affect operability. With the bottom surface 201*c* provided on the concave part 201, some fingers inserted into the concave part 201 come into contact with the bottom surface 201*c*. This makes it possible to prompt the user to grip the gripping portion 200 without deeply inserting the fingers into the concave part 201.

Further, with the opening 204 of the concave part 201 formed over the region in the longitudinal direction, when gripping the gripping portion 200 of the cartridge B outside the apparatus main body A to mount the cartridge B in the apparatus main body A, it is conceivable that the user puts fingers into the concave part 201 from the lower opening 204 to grip the gripping portion 200. This makes it difficult for the user to mount the cartridge B in the apparatus main body A. In a case where the bottom surface 201*c* is provided on the concave part 201, the upper opening 204 of the concave part 201 for insertion of fingers has a wider space than the lower opening 204 has. This makes it possible to prompt the user to put fingers into the concave part 201 from above to grip the gripping portion 200.

As described above, according to the present exemplary embodiment, a cartridge can be provided including a gripping portion easily gripped even in a narrow space in the apparatus main body of an image forming apparatus.

The gripping portion according to the present exemplary embodiment is applicable to a cartridge including a photosensitive drum and a developing roller, as well as to a developing cartridge not including a photosensitive drum and a toner cartridge storing toner alone without a photosensitive drum or a developing roller. In addition, the gripping portion according to the present exemplary embodiment is applicable to a cartridge attachable to/detachable from the apparatus main body of an image forming apparatus, such as a fixing device and a transfer unit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-013028, filed Jan. 31, 2024, which is hereby incorporated by reference herein in its entirety.

What is claimed is:

1. A cartridge attachable to/detachable from an apparatus main body of an image forming apparatus in a mounting direction, the cartridge comprising:

a storage portion configured to store toner;

a stirring member configured to be rotated around a rotation axis and to stir the toner in the storage portion, the rotation axis extending in a direction intersecting the mounting direction; and a gripping portion provided upstream of the storage portion in the mounting direction, wherein the gripping portion includes, when the cartridge is in a mounted orientation of being mounted in the apparatus main body, a concave portion whose longitudinal direction is a direction of the rotation axis, an upper part of the concave portion being opened, the concave portion including a bottom surface, and a first wall, and a second wall extending upward from an upstream and a downstream of the bottom surface, respectively, in the mounting direction, the concave portion including an opening extended from the bottom surface to the first wall at a center portion in the longitudinal direction, and wherein the gripping portion includes a third wall which faces the second wall through the opening and which is provided at a position above the bottom surface and farther from the storage portion than the first wall in a horizontal direction when the cartridge is in the mounted orientation.

2. The cartridge according to claim 1, wherein the third wall includes an inclined surface inclined to be directed upward as approaching the storage portion in the horizontal direction when the cartridge is in the mounted orientation.

3. The cartridge according to claim 2, wherein the first wall is inclined to be directed downward as approaching the storage portion in the horizontal direction when the cartridge is in the mounted orientation.

4. The cartridge according to claim 1, wherein the third wall includes a protruding rib above a lowest point of the third wall as viewed in the longitudinal direction, and wherein, as viewed in the longitudinal direction, a virtual line passing an end of the rib and the lowest point of the third wall is inclined to be directed upward as approaching the storage portion in the horizontal direction.

5. The cartridge according to claim 4, wherein the first wall is inclined to be directed downward as approaching the storage portion in the horizontal direction when the cartridge is in the mounted orientation.

6. The cartridge according to claim 1, wherein the second wall is a wall constituting the storage portion.

7. The cartridge according to claim 1, wherein the rotation axis and the third wall overlap with each other as viewed in the horizontal direction when the cartridge is in the mounted orientation.

8. The cartridge according to claim 1, wherein the third wall includes a first rib and a second rib both protruding as viewed in the longitudinal direction, and wherein, as viewed in the longitudinal direction, a virtual line passing an end of the first rib and an end of the second rib is inclined to be directed upward as approaching the storage portion in the horizontal direction.

9. The cartridge according to claim 8, wherein the first wall is inclined to be directed downward as approaching the storage portion in the horizontal direction when the cartridge is in the mounted orientation.

* * * * *